(12) United States Patent
Teflioudi et al.

(10) Patent No.: US 12,204,537 B1
(45) Date of Patent: Jan. 21, 2025

(54) CUSTOM TABLE SCAN FOR TOP K QUERIES

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/355,318

(22) Filed: Jul. 19, 2023

(51) Int. Cl.
  *G06F 16/20* (2019.01)
  *G06F 16/2453* (2019.01)

(52) U.S. Cl.
  CPC .. *G06F 16/24537* (2019.01); *G06F 16/24542* (2019.01)

(58) Field of Classification Search
  CPC .............................. G06F 16/909; G06F 16/904
  See application file for complete search history.

(56) References Cited

U.S. PATENT DOCUMENTS 11,880,369 B1 * 1/2024 Heimel ............. G06F 16/24557

* cited by examiner

*Primary Examiner* — Kristopher Andersen
(74) *Attorney, Agent, or Firm* — Mintz Levin Cohn Ferris Glovsky and Popeo, P.C.

(57) ABSTRACT

In some implementations, there is provided a method that includes receiving a query request including a top k query operator for query plan generation, optimization, and execution, wherein k defines a threshold limit of query results for the top k query operator; inserting into a query plan a check operator associated with the top k query operator; in response to executing the query plan, checking, by the check operator, whether an early exit occurs due to the top k query operator reaching the threshold limit; in response to the early exit occurring due to the top k query operator reaching the threshold limit, stopping processing, by the check operator, including opening of another fragment of a database table; and in response to the early exit not occurring, allowing, by the check operator, the opening of the other fragment of the database table.

20 Claims, 7 Drawing Sheets

```
                                    ┌ 300
                                    ↙
┌──────────────────────────────────────────────────────────────────────┐
│ Receiving a query request including a top k query operator for query │
│ plan generation, optimization, and execution, wherein k defines a    │
│ threshold limit of query results for the top k query operator 352    │
└──────────────────────────────────────────────────────────────────────┘
                                    │
┌──────────────────────────────────────────────────────────────────────┐
│ Generating a query plan that includes the top k query operator 354   │
└──────────────────────────────────────────────────────────────────────┘
                                    │
┌──────────────────────────────────────────────────────────────────────┐
│ Inserting into a query plan a check operator associated with the     │
│ top k query operator 356                                             │
└──────────────────────────────────────────────────────────────────────┘
                                    │
┌──────────────────────────────────────────────────────────────────────┐
│ In response to executing the query plan, checking, by the check      │
│ operator, whether an early exit occurs due to the top k query        │
│ operator reaching the threshold limit 358                            │
└──────────────────────────────────────────────────────────────────────┘
                                    │
┌──────────────────────────────────────────────────────────────────────┐
│ In response to the early exit occurring due to the top k query       │
│ operator reaching the threshold limit, stopping processing, by the   │
│ check operator, including opening of another fragment of a database  │
│ table 360                                                            │
└──────────────────────────────────────────────────────────────────────┘
                                    │
┌──────────────────────────────────────────────────────────────────────┐
│ In response to the early exit not occurring, allowing in response to │
│ the early exit not occurring, allowing, by the check operator, the   │
│ opening of the other fragment of the database table 365              │
└──────────────────────────────────────────────────────────────────────┘
```

CUSTOM TABLE SCAN FOR TOP K QUERIES

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for custom table scans. In some implementations, there is provided a method that includes receiving a query request including a top k query operator for query plan generation, optimization, and execution, wherein k defines a threshold limit of query results for the top k query operator; inserting into a query plan a check operator associated with the top k query operator; in response to executing the query plan, checking, by the check operator, whether an early exit occurs due to the top k query operator reaching the threshold limit; in response to the early exit occurring due to the top k query operator reaching the threshold limit, stopping processing, by the check operator, including opening of another fragment of a database table; and in response to the early exit not occurring, allowing, by the check operator, the opening of the other fragment of the database table.

In some variations, one or more features disclosed herein including one or more of the following features may be implemented as well. A database execution engine may execute the query plan comprising the check operator and the top k query operator using a first fragment, wherein the check operator processes the first fragment and performs the checking whether the early exit occurs due to the top k query operator reaching the threshold limit. The check operator may process the first fragment and may perform the checking whether the early exit occurs due to the top k query operator reaching the threshold limit before loading a second fragment. The check operator may orchestrate fragment loading by preferring a first fragment loaded into an in-memory portion of a database execution engine before use of a second fragment that requires loading into the in-memory portion of a database execution engine. The check operator may be inserted into the query plan in response to a value of k being less than a threshold value. The query plan may be generated to include the top k query operator, wherein the check operator is inserted into the generated query plan. The check operator may be inserted into the generated query plan by inserting a table scan operator that incorporates logic for the check operator. In response to the query request including the top k query operator, the query plan may be generated to include the check operator configured to orchestrate loading of fragments while performing the checking of whether the early exit occurs due to the top k query operator reaching the threshold limit. The top k query operator may include a limit operator configured with the threshold limit. At least one database execution engine may be used to perform the receiving, the inserting, the checking, the stopping, and the allowing.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

When a query is received, a table scan may be used to open up all of the fragments of the database table (which for example may be stored across one or more nodes of a database system configured to provide distributed query processing) and to load the fragments in-memory of the in-memory database. After loading all of the fragments in-memory, the fragments are processed. In the case of a top k query (also referred to herein as a query containing a LimitOp), all of the fragments which have been loaded in-memory may not be needed if the top k query early exits with a top k query result. As such, there is a waste of memory and compute resources caused in this situation where some fragments are needlessly loaded in-memory when there is an early exit caused by the top k query.

In some implementations, a database execution engine receives a query request including a top k query request for query plan generation, optimization, and execution. When this is the case, the database execution engine generates a query plan that includes the top k query. For example, the query plan may include a table scan operator, the LimitOp operator, and so forth. During query plan generation, a check operator is inserted into the query plan. The check operator is configured to (during query execution) check whether LimitOp has early exited (e.g., reached its top k query result). During execution of the query plan ("query plan execution") which includes the check operator, a database table may be read and loaded in-memory one fragment at a time to provide input data to the plurality of operators of the query plan, rather than load all of the fragments in-memory. For example, a first fragment (e.g., a portion such as a column of a database table, a row of a database table, and/or other type of portion) is loaded in-memory for execution by the operators of the query plan. And during execution of the query plan, the check operator (which is included in the query plan) checks whether the top k query operator (e.g., a LimitOp k) has caused an early exit. For example, a top k query operator may select the top three (e.g., where k in this example is 3) largest values. If the early exit has not occurred, the check operator allows the query execution to continue processing such as loading (e.g., opening) of additional fragments in-memory. If the early exit is reached, the check operator stops the loading in-memory of any additionally fragments of the database table (which provides the input data or data chunks for the top k query). By using the check operator (which is inserted into the query plan), memory resources and compute resources may be saved (which ultimately improves query processing time) caused by needlessly loading in-memory fragments when there is an early exit caused by the top k operator.

Before providing additional description regarding the "check operator," the following provides description regarding an example database management system in which the check operator can be practiced.

In the case of an in-memory relational database system, the in-memory relational database may utilize main memory ("in-memory") for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results. Although some of the examples refer to an in-memory database, the subject matter disclosed herein with respect to the custom table scans for top query operators may be used with other types of databases as well.

The throughput and storage capacity of a database, such as an in-memory column-oriented relational database as well as other types of databases, may be maximized by distributing the processing and storage of data across multiple computing nodes. A single database table may therefore be divided into multiple fragments (also referred to as partitions). For example, a fragment can be a portion of a database such as column (or portion thereof), a row (or portion thereof), and/or other portion of a database table. In the case of a plurality of fragments, each fragment may be stored in a computing node (of a plurality of computing nodes) to provide distributed query processing. Doing so may maximize opportunities for parallelization in which a single query is divided into multiple tasks and assigned to individual worker threads for parallel execution. As used herein, the term "worker thread" refers to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine (which may also be referred to as a query execution engine or an execution engine, for short) may divide a query accessing a dataset (e.g., one or more database tables) into a quantity of tasks determined based on the quantity of time required to execute the query on a portion of the dataset. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

Moreover, the database execution engine may also use pipelining. In the case of pipelining, the database execution engine breaks up data into smaller chunks of data, such that each smaller chunk of data can be processed by a series of one or more operators. The operators refer to low-level operators, such as code that performs a specific operation during operator execution, rather than a high-level relational algebra operator. For example, the low-level operator may implement a lock on a database table, perform an index scan, perform a table scan at a given database, perform a limit operation (e.g., LimitOp), and/or the like. During query plan generation and optimization, these low-level operators may be connected with each other to form a graph, such as a directed acyclic graph (DAG). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that the output of one element of the pipeline is the input of the next element of the pipeline, and buffer storage may be used between the elements. In some instances, the operators of a pipeline can be executed in parallel, sequentially, or in time-sliced fashion.

In some implementations, a database execution engine may, as noted, receive a query request that includes a "top k query" request. The top k query refers to a query that requests only a quantity "k" of the top results (e.g., query responses). For example, a top k query may retrieve only k (where k is greater than or equal to 1) query results from a data set of a database management system (or database, for short). For example, a "Select Top 10 Customer Id from Sales.Data.Table Orderby OrderDate Desc" would return, as a query result, the 10 most recent customers (which are identified by their Customer ID) to place an order. Without the top k, the query result would include all of the customer IDs sorted by Order Date.

In the case of a top k query, a "LimitOp" operator is used to count the incoming query results (e.g., count the quantity of returned results, count the quantity of rows in the result, etc.), and as long as the limit k is not exceeded, the LimitOp pushes the query results to the next operator in the pipeline. If the limit k is reached however, the LimitOp stops pushing the data to the next operator in the pipeline. Although some of the examples refer to the LimitOp and/or the top K as the early exit operator of the pipeline of the directed acyclic graph, other types of operators may be used as an early exit operator, such as a Distinct operator, a Min aggregation, a Max aggregation, and/or other operators which may provide an early exit at the operator and a corresponding opportunity to prune specific parts of the query plan.

Figure 1A:
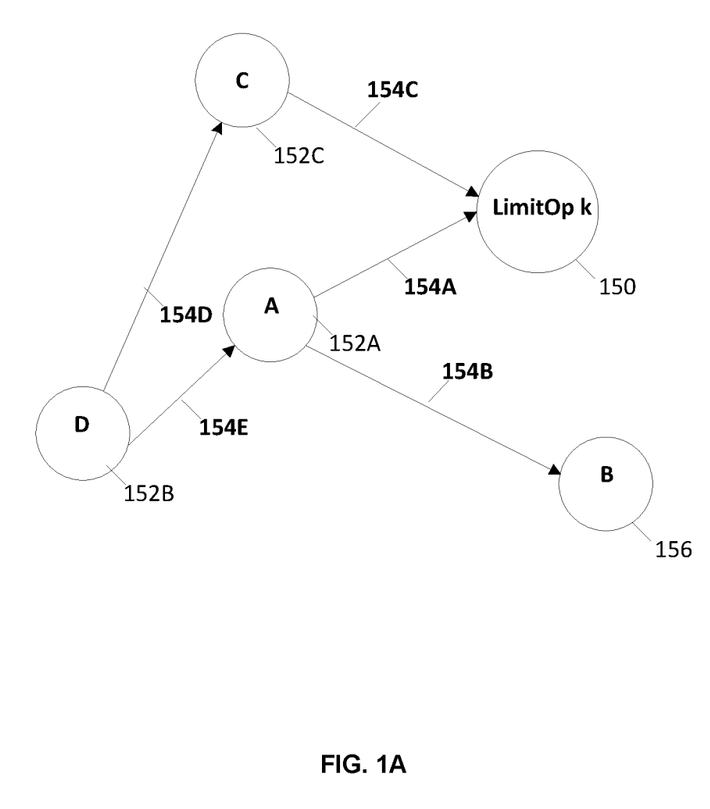
FIG. 1A illustrates an example of a portion of a directed acyclic graph, in accordance with some implementations.

FIG. 1A illustrates an example of a portion of a directed acyclic graph for a pipeline where the circles correspond to operators 150, 152A-C, and 156, which are connected by links 154A, 154B, 154C, 154D, and 154E. In this example, the LimitOp k 150 reaches its limit of k results, so an early exit is performed at LimitOp k and LimitOp k returns the k results and stops processing. In this example, the LimitOp k is an example of an operator that early exits ("early exit operator") that is able to stop processing. The operators of a pipeline may, as noted, form or represent a directed acyclic graph, and each operator may have one or more outgoing links (which are used to push data) to one or more other operators. Likewise, each operator may have one or more incoming links (which provide data to the operator) from one or more other operators. As noted, FIG. 1A depicts an example of a pipeline including operators 150, 152A-C, and 156, which are connected by links 154A-E.

Figures 1B, 1C:
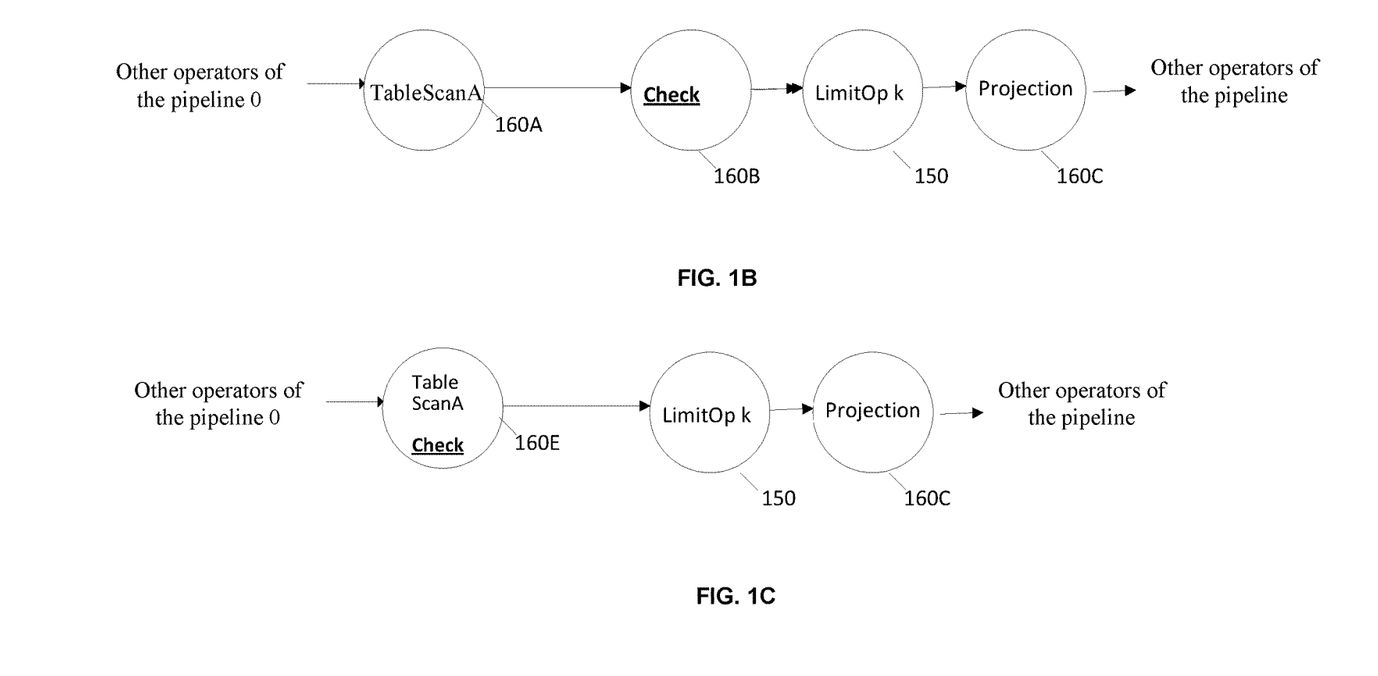
FIGS. 1B, 1C, and 1D illustrate examples of a query plan of operators configured in a pipeline, in accordance with some implementations.

In some implementations, when a query plan is generated (and, e.g., the directed acyclic graph is generated), the database execution engine may insert into the query plan a check operator. FIG. 1B depicts an example of a portion of a query plan including a plurality of operators 160A, 160B, 150, 160C, and so forth. During query plan generation, the database execution engine detects the use of a LimitOp 150 (which is used to track the top k results for the top k query) and inserts the check operator 160B into the pipeline of operators as shown at FIG. 1B. Alternatively, or additionally, the function (e.g., logic) of the check operator may be included in the Table Scan 160E as shown at FIG. 1C. As used herein, the phrase "check operator" refers the check operator 160B and/or the table scan 160E configured to include the check operator function. In any case, the special check operator orchestrates loading of fragments while checking for a limit to be reached at a LimitOp of a top k query. In some implementations, when the check operator is configured into the query plan, the check operator controls loading with checks of the limit being reached by the LimitOp associated with the top k to prevent unnecessary fragments from being loaded and/or processed.

To illustrate further, when a top k (or LimitOp) is part of the query plan, the check operator (e.g., the check operator 160B or the Table Scan operator 160E configured to include the check operator function) is configured to orchestrate the order in which low level operators are called to process, such as load, fragments into the in-memory portion of the database management system or database execution engine. Suppose for example a first fragment is not stored in memory, a second fragment is already loaded in-memory (e.g., loaded by a prior query), and a third fragment is not stored in-memory. In the case of a top k, the check operator (e.g., the check operator 160B or the Table Scan operator 160E) orchestrates which low level operators are called and thus which fragments are processed and/or loaded in-memory. To illustrate further, the query plan may include the check operator which is linked to other low level operators such as the following:

a first operator that loads the first fragment in memory and takes a lock;
a second operator that takes lock on the second fragment;
a third operator that loads the third fragment in memory and take lock;
a fourth operator that performs a dictionary scans and/or retrieves index results for the first fragment;
a fifth operator that performs a dictionary scans and/or retrieves index results for the second fragment;
a sixth operator that performs a dictionary scans and/or retrieves index results for the third fragment;
a seventh operator that gathers output estimations for the first fragment;
an eighth operator that gathers output estimations for the second fragment;
a ninth operator that gathers output estimations for the third fragment;
a $10^{th}$ operator that performs the actual scan and produce the results for the first fragment;

an $11^{th}$ operator that performs the actual scan and produce the results for the second fragment; and a $12^{th}$ operator that performs the actual scan and produce the results for the third fragment.

During query execution, the check operator (e.g., the check operator 160B or the Table Scan operator 160E) orchestrates (e.g., controls) the order to execute the low level operators (e.g., 1-12 operators noted above). Since in the example the second fragment is already loaded in-memory, the check operator does not need to load the data of the second fragment into main memory, so the check operator may choose (e.g., give preference to the already loaded fragment) to process the second fragment using the following low level operators:

the second operator that takes lock on the second fragment;

the fifth operator that performs a dictionary scans and/or retrieves index results for the second fragment;

the eighth operator that gathers output estimations for the second fragment; and the $11^{th}$ operator that performs the actual scan and produce the results for the second fragment.

After the second fragment is processed, the check operator will then check if the limit has been reached at the LimitOp 150. If the limit has been reached, the check operator will stop processing altogether. If the limit has not been reached, the check operator will continue with the next fragment (which is the first fragment which is not stored in-memory) using the following low level operators for example:

a first operator that loads the first fragment in memory and takes a lock;

a fourth operator that performs a dictionary scans and/or retrieves index results for the first fragment;

a seventh operator that gathers output estimations for the first fragment; and.

a $10^{th}$ operator that performs the actual scan and produce the results for the first fragment.

After the first fragment is processed, the check operator will again check if the limit has been reached at the LimitOp 150. If the limit has been reached, the check operator will stop processing altogether (so additional fragments are not loaded). If the limit has not been reached, the check operator will continue with the next fragment (which in this example is the third fragment which is not stored in-memory) using the following low level operators for example:

a third operator that loads the third fragment in memory and take lock;

a sixth operator that performs a dictionary scans and/or retrieves index results for the third fragment;

a ninth operator that gathers output estimations for the third fragment;

an $11^{th}$ operator that performs the actual scan and produce the results for the second fragment; and a $12^{th}$ operator that performs the actual scan and produce the results for the third fragment.

In other words, if the LimitOp has not reached its limit (e.g., early exited due to the k limit of results being reached), the check operator allows the processing of operators to continue and the loading and/or processing of additional fragments. If the LimitOp has reached its limit (e.g., the k limit of results being reached), the check operator ceases operation and thus stops (or causes the stop of) the loading in-memory of additional fragments. In some implementations, the check operator (which is inserted into the query plan) can save memory resources, IO overhead and compute resources caused by needlessly loading in-memory one or more fragments when there is an early exit caused by the top k operator (e.g., the LimitOp k 150).

Figure 2A:
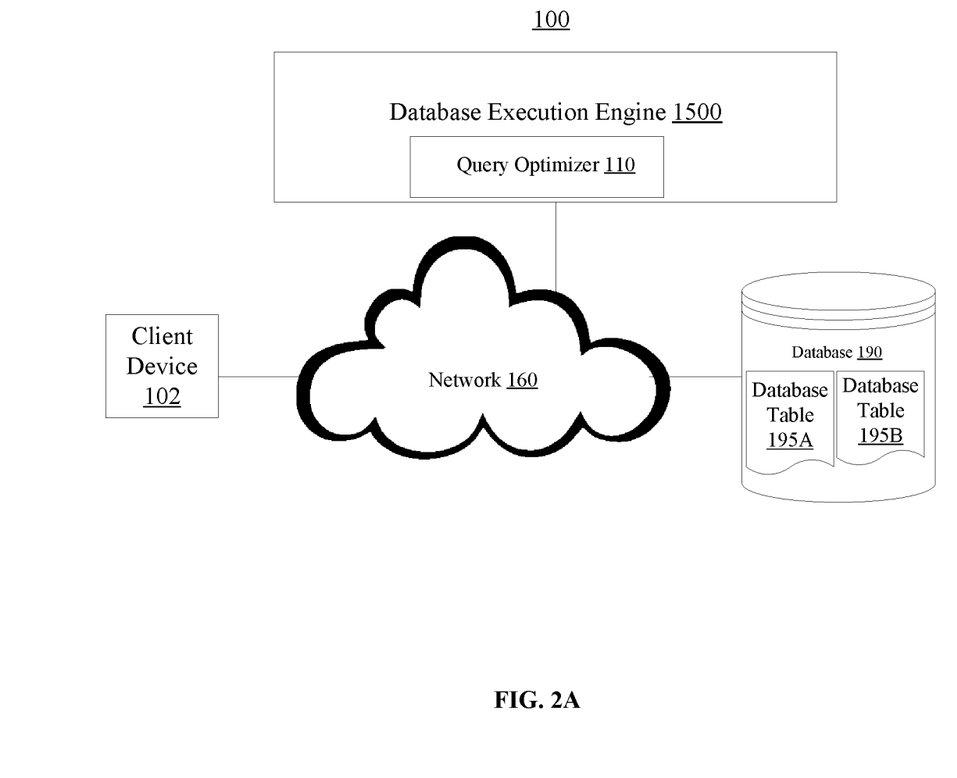
FIGS. 2A and 2B depict examples of systems including a database execution engine, in accordance with some implementations.

FIG. 2A depicts a system diagram illustrating an example of a system 100 in which the check operator can be practiced in accordance with some implementations. Referring to FIG. 2A, the system 100 may include one or more client devices such as client device 102, a database execution engine 1500, and one or more databases, such as a database 190. As shown in FIG. 2A, the client device 102, the database execution engine 1500, and the database 190 (which may include one or more database tables 195A-B) may be communicative coupled via a network 160.

The one or more databases such as the database 90 may include a variety of relational database technologies including, for example, an in-memory database, a column-based database, a row-based database, hybrid database (e.g., combination of column and row based), and/or the like. The one or more client devices such as client device 102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

Figure 2B:
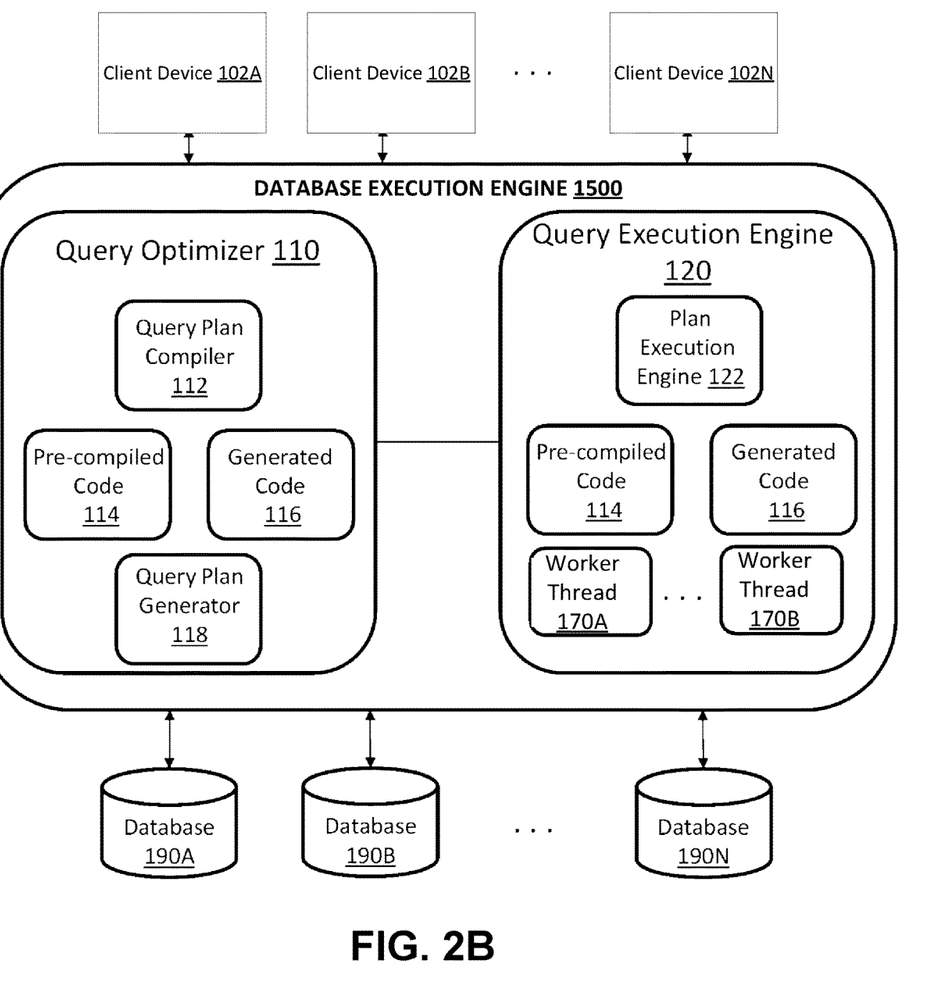

FIG. 2B depicts a block diagram illustrating an example implementation of the database execution engine 1500, in accordance with some implementations. As shown in FIG. 2B, the one or more databases may include a first database 190A, a second database 190B, and a third database 190C, and the database(s) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102A-102N may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators that may be configured into one or more pipelines. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of the databases 190A-N.

The query execution engine 120 may, as noted, be configured to handle different types of databases and the corresponding persistent layers and/or tables therein. For example, the one or more databases 190A-N may include at least one row-oriented database, in which case an insert is performed by adding a row with a corresponding row identifier. Alternatively and/or additionally, the one or more databases 190A-N may include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to optimize execution of query related operations. In addition, the query execution engine 120 may provide for a plan execution framework that is able to handle data chunk (s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 1500 may divide the database table 195 into multiple fragments by applying one or more of a hash partitioning, round robin partitioning, and range partitioning.

Figure 3A:
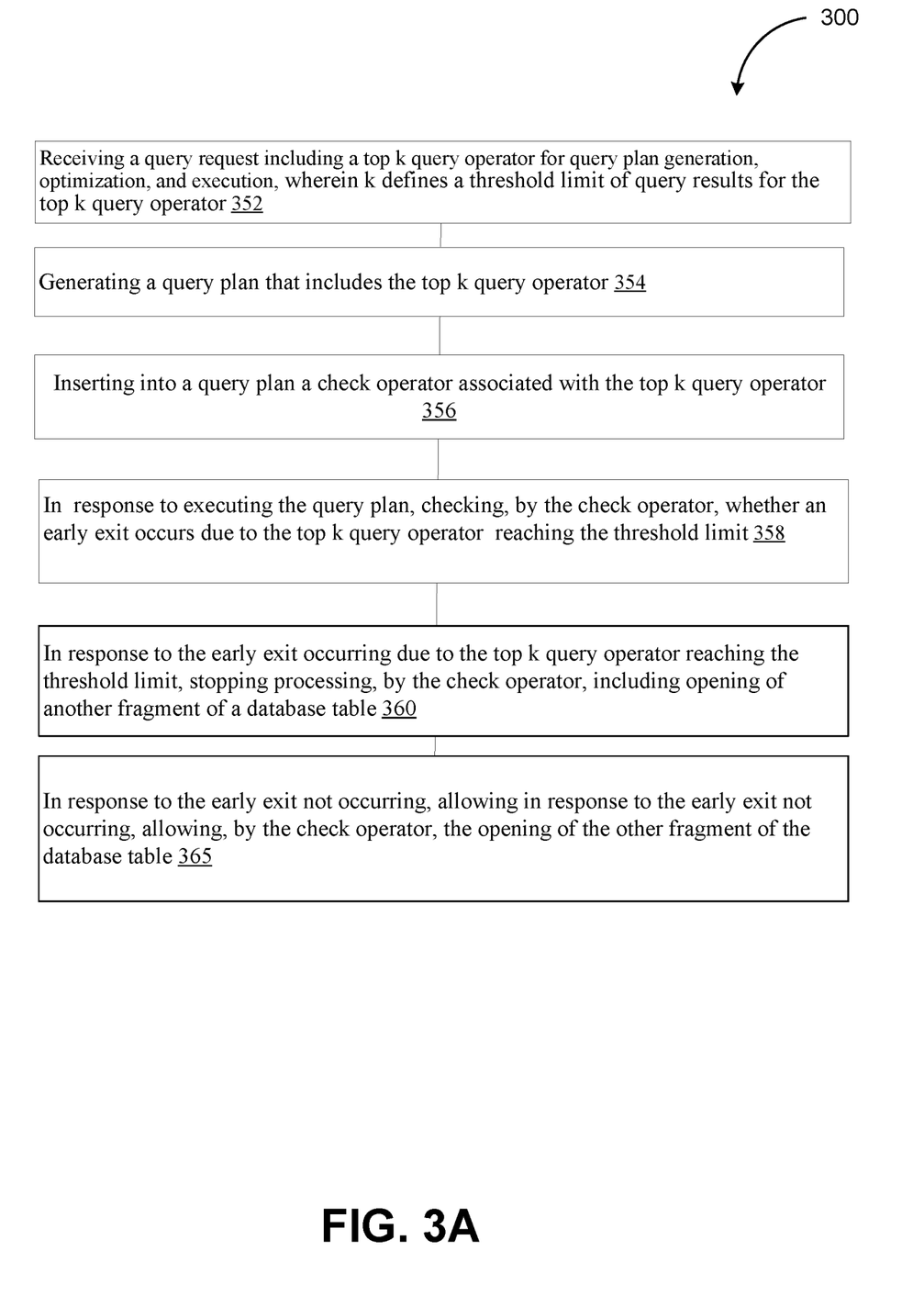
FIGS. 3A and 3B depict examples of processes for using a check operator to control fragment loading, in accordance with some implementations.

FIG. 3A depicts a flowchart illustrating an example of a process 300 for optimizing queries using a top k operator in a distributed query processing environment, in accordance with some implementations.

At 352, a query request including a top k query operator may be received for query plan generation, optimization, and execution, wherein k defines a threshold limit of query results for the top k query operator, in accordance with some implementations. For example, the database execution engine 1500 may receive a request for a top k query from a client device, such as client device 102A. The value of "k" defines the threshold limit of values for the result set (e.g., when "k" values are reached in the result set, the operator can early exit as it's limit has been reached).

Figure 1D:
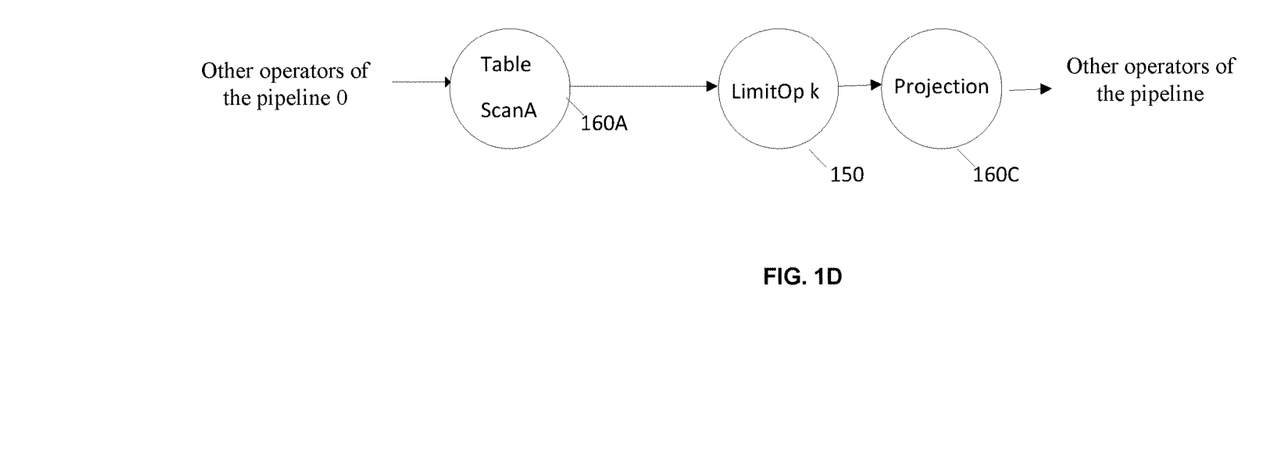

At 354, a query plan that includes the top k query operator may be generated, in accordance with some implementations. For example, the database execution engine 1500 may generate a query plan that includes a top k query operator. Referring to FIG. 1D, the query plan may include a plurality of operators, such as a table scan A operator 160A, a LimitOp k operator 150, and a projection operator 160C. In this example, the query plan includes a top k query operator in the form of a LimitOp k. Alternatively, or additionally, the query plan may be configured for pipelining. Alternatively, or additionally, the query plan may be configured for distributed query processing using fragments stored across nodes.

At 356, a check operator is inserted into the query plan associated with the top query operator, in accordance with some implementations. For example, the database execution engine may detect the presence of the top k query operator and insert a check operator 160B into the query plan as shown at FIG. 1B. Alternatively, the check operator may be inserted into the query plan incorporating the check operator into a table scan 160E function, so the table scan functionality would be configured to provide the check operator as shown at FIG. 1C for example. The check operator is associated with the top k operator (e.g., LimitOp 150) such that the check operator "checks" from time to time for the threshold limit k being reach, which can cause the early exit at the LimitOp 150. As used herein, the "check operator" (1) checks whether a top k query operator, such as a LimitOp k operator, has reached a threshold limit k of results (which can cause an early exit by the LimitOp k). Alternatively, or additionally, the phrase "check operator" may orchestrate the opening of fragments (e.g., one by one with checks of the LimitOp to determine if the LimitOp reached the threshold limit k and early exited). If the LimitOp reaches its threshold limit (and/or early exits), the check operator may cease processing so additional fragments are not loaded and/or processed into the pipeline. However, if the LimitOp does not reach its threshold limit (e.g., does not early exit), the check operator may continue processing another fragments (e.g., load another fragment, perform another check, and so forth). Alternatively, or additionally, the check operator may orchestrate the order of the loading and processing of fragments, such that processing of one or more fragments already in-memory occurs before (e.g., is preferred over) one or more fragments that need to be loaded into memory. For example, if a second fragment is already in-memory (e.g., due to a prior query), the check operator may cause that second fragment to be used and thus processed by the pipeline, then perform the check to see if the LimitOp reached the k limit, and if not, the check operator may then continue processing by loading a first fragment in-memory. After the query plan is generated, the database execution engine 1500 may execute the query, which may include loading a fragment in-memory to provide input data for the pipeline of operators. Although some of the examples refer to the database execution engine 1500, other types of engines (e.g., processors) may be used to execute a query plan at a database.

In response to executing the query plan, checking, by the check operator, execution at 358 whether an early exit occurs due to the top k query operator reaching the threshold limit, in accordance with some implementations. For example, the query plan comprising a plurality of operators may be executed. In the example of FIG. 1C, the table scan operator 160E may load a single fragment in-memory and push the data to other operators in the pipeline. The check logic of the table scan operator 160E (or the check 160B if a stand-alone check operator is used as in the example of FIG. 1B) may then check to see if the LimitOp 150 early exited due to the threshold limit of k results being obtained.

At 360, in response to the early exit occurring due to the top k query operator reaching the threshold limit, the check operator may stop processing including opening of another fragment of a database table, in accordance with some implementations. For example, if the LimitOp k 150 early exits (e.g., obtains the k results), the check operator 160B/160E may stop the processing and/or loading of additional fragments.

At 365, in response to the early exit not occurring, the check operator allows the opening of the other fragment of the database table, in accordance with some implementations. For example, if the LimitOp k 150 does not early exit (e.g., does not reach the k results), the check operator may allow the opening of another fragment of a database table to continue (e.g., by resuming execution of the query plan).

Figure 3B:
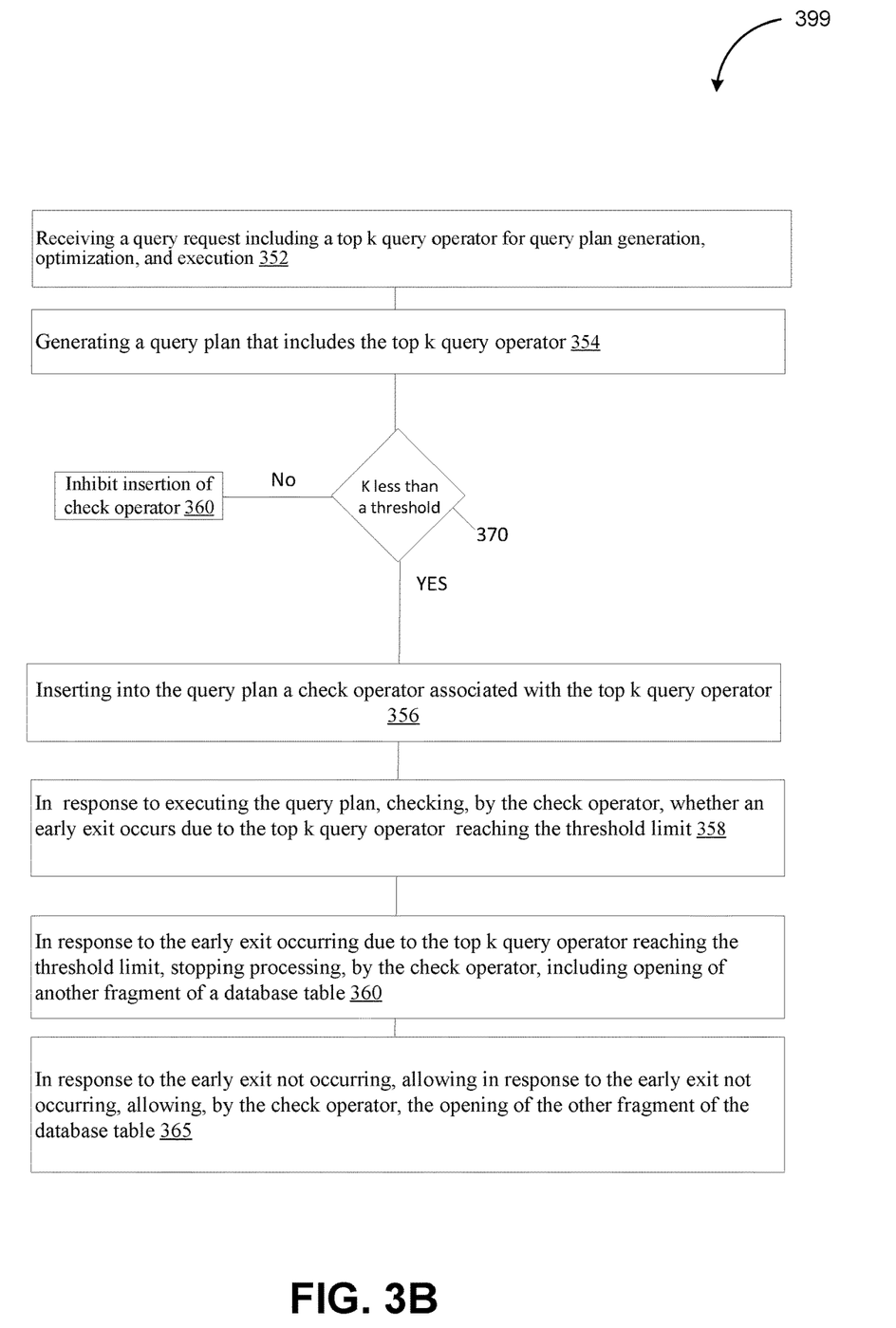

FIG. 3B depicts another example of a flowchart for a process 399 for optimizing queries using a top k operator in a distributed query processing environment, in accordance with some implementations. The process at FIG. 3B is similar to the process at FIG. 3A in some respects. However, after the query plan that includes the top k query operator is generated at 354, the database execution engine 1500 determines whether the value "k" of the top k query (or, e.g., LimitOp 150) is less than a threshold value. If less than a threshold value (Yes at 370), the process continues with 356-365 as noted above with respect to FIG. 3A. If the database execution engine 1500 determines the value "k" of the top k query (or, e.g., LimitOp 150) is more than a threshold value (No at 370), the database execution engine does not insert the check operator into the query plan, so the query plan execution may proceed by loading all of the fragments rather than use the check operator and load fragments one by one. For example, if the value of k is more than a threshold value (e.g., 100 or other value), the top k will likely need to load a large amount of fragments before the top k limit is reached, so it may be more efficient to load all of the fragments rather than load fragments one by one process as used with the check operator.

Figure 4:
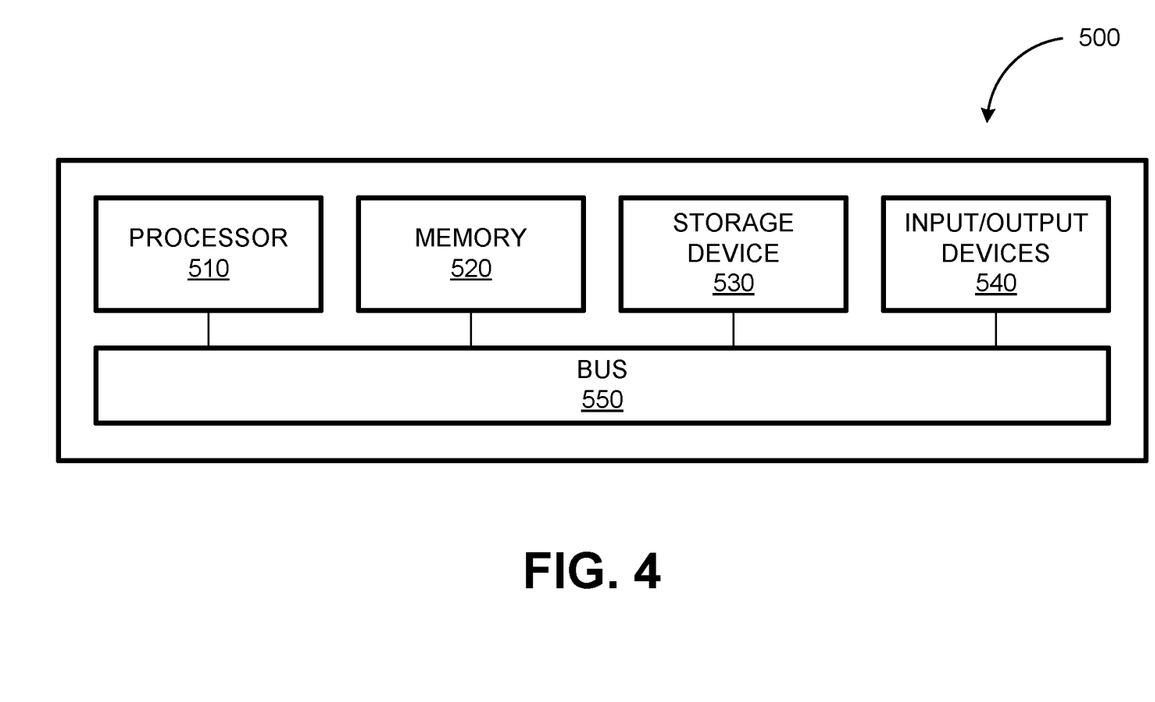
FIG. 4 depicts a block diagram illustrating an example of a computing system, in accordance with some implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions which, when executed by the at least one data processor, cause operations comprising:
receiving a query request including a top k query operator for query plan generation, optimization, and execution, wherein k defines a threshold limit of query results for the top k query operator;
inserting into a query plan a check operator associated with the top k query operator;
in response to executing the query plan, checking, by the check operator, whether an early exit occurs due to the top k query operator reaching the threshold limit;
in response to the early exit occurring due to the top k query operator reaching the threshold limit, stopping processing, by the check operator, including opening of another fragment of a database table; and
in response to the early exit not occurring, allowing, by the check operator, the opening of the other fragment of the database table.

Example 2: The system of Example 1 further comprising:
executing, by a database execution engine, the query plan comprising the check operator and the top k query operator using a first fragment, wherein the check operator processes the first fragment and performs the checking whether the early exit occurs due to the top k query operator reaching the threshold limit.

Example 3: The system of any of Examples 1-2, wherein the check operator processes the first fragment and performs the checking whether the early exit occurs due to the top k query operator reaching the threshold limit before loading a second fragment.

Example 4: The system of any of Examples 1-3, wherein the check operator orchestrates fragment loading by preferring a first fragment loaded into an in-memory portion of a database execution engine before use of a second fragment that requires loading into the in-memory portion of a database execution engine, and/or wherein the check operator is inserted into the query plan in response to a value of k being less than a threshold value.

Example 5: The system of any of Examples 1-4 further comprising: generating the query plan that includes the top k query operator, wherein the check operator is inserted into the generated query plan.

Example 6: The system of any of Examples 1-5, wherein the check operator is inserted into the generated query plan by inserting a table scan operator that incorporates logic for the check operator.

Example 7: The system of any of Examples 1-6, wherein in response to the query request including the top k query operator, the query plan is generated to include the check operator configured to orchestrate loading of fragments while performing the checking of whether the early exit occurs due to the top k query operator reaching the threshold limit.

Example 8: The system of any of Examples 1-7, wherein the top k query operator comprises a limit operator configured with the threshold limit.

Example 9: The system of any of Examples 1-8, wherein at least one database execution engine performs the receiving, the inserting, the checking, the stopping, and the allowing.

Example 10: A method comprising:
receiving a query request including a top k query operator for query plan generation, optimization, and execution, wherein k defines a threshold limit of query results for the top k query operator;
inserting into a query plan a check operator associated with the top k query operator;
in response to executing the query plan, checking, by the check operator, whether an early exit occurs due to the top k query operator reaching the threshold limit;
in response to the early exit occurring due to the top k query operator reaching the threshold limit, stopping processing, by the check operator, including opening of another fragment of a database table; and
in response to the early exit not occurring, allowing, by the check operator, the opening of the other fragment of the database table.

Example 11: The method of Example 10 further comprising:
executing, by a database execution engine, the query plan comprising the check operator and the top k query operator using a first fragment, wherein the check operator processes the first fragment and performs the checking whether the early exit occurs due to the top k query operator reaching the threshold limit.

Example 12: The method of any of Examples 10-11, wherein the check operator processes the first fragment and performs the checking whether the early exit occurs due to the top k query operator reaching the threshold limit before loading a second fragment.

Example 13: The method of any of Examples 10-12, wherein the check operator orchestrates fragment loading by preferring a first fragment loaded into an in-memory portion of a database execution engine before use of a second fragment that requires loading into the in-memory portion of a database execution engine, and/or wherein the check operator is inserted into the query plan in response to a value of k being less than a threshold value.

Example 14: The method of any of Examples 10-131, further comprising: generating the query plan that includes the top k query operator, wherein the check operator is inserted into the generated query plan.

Example 15: The method of any of Examples 10-14, wherein the check operator is inserted into the generated query plan by inserting a table scan operator that incorporates logic for the check operator.

Example 16: The method of any of Examples 10-15, wherein in response to the query request including the top k query operator, the query plan is generated to include the check operator configured to orchestrate loading of fragments while performing the checking of whether the early exit occurs due to the top k query operator reaching the threshold limit.

Example 17: The method of any of Examples 10-16, wherein the top k query operator comprises a limit operator configured with the threshold limit.

Example 18: The method of any of Examples 10-17, wherein at least one database execution engine performs the receiving, the inserting, the checking, the stopping, and the allowing.

Example 19: A non-transitory computer-readable storage medium including instructions which, when executed by at least one data processor, cause operations comprising:
receiving a query request including a top k query operator for query plan generation, optimization, and execution, wherein k defines a threshold limit of query results for the top k query operator;
inserting into a query plan a check operator associated with the top k query operator;
in response to executing the query plan, checking, by the check operator, whether an early exit occurs due to the top k query operator reaching the threshold limit;
in response to the early exit occurring due to the top k query operator reaching the threshold limit, stopping processing, by the check operator, including opening of another fragment of a database table; and
in response to the early exit not occurring, allowing, by the check operator, the opening of the other fragment of the database table.

Example 20: The non-transitory computer-readable storage medium of Example 19 further comprising:
executing, by a database execution engine, the query plan comprising the check operator and the top k query operator using a first fragment, wherein the check operator processes the first fragment and performs the checking whether the early exit occurs due to the top k query operator reaching the threshold limit.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A system, comprising:
at least one data processor; and at least one memory storing instructions which, when executed by the at least one data processor, cause operations comprising:

receiving a query request including a top k query operator for query plan generation, optimization, and execution, wherein k defines a threshold limit of query results for the top k query operator;

inserting into a query plan a check operator associated with the top k query operator;

in response to executing the query plan, checking, by the check operator, whether an early exit occurs due to the top k query operator reaching the threshold limit;

orchestrating, by the check operator, an order in which low level operators of the query plan are executed to load fragments of a database table into an in-memory portion of a database execution engine;

in response to the early exit occurring due to the top k query operator reaching the threshold limit, stopping processing, by the check operator, including opening of another fragment of a database table;

in response to the early exit not occurring, allowing, by the check operator, the opening of the other fragment of the database table; and returning, as a query result, a result set of the top k results.

2. The system of claim 1, further comprising:
executing, by a database execution engine, the query plan comprising the check operator and the top k query operator using a first fragment, wherein the check operator processes the first fragment and performs the checking whether the early exit occurs due to the top k query operator reaching the threshold limit.

3. The system of claim 2, wherein the check operator processes the first fragment and performs the checking whether the early exit occurs due to the top k query operator reaching the threshold limit before loading a second fragment.

4. The system of claim 1, wherein the check operator orchestrates fragment loading by giving preference to loading a first fragment into an in-memory portion of a database execution engine before use of a second fragment that requires loading into the in-memory portion of a database execution engine.

5. The system of claim 1, further comprising:
generating the query plan that includes the top k query operator, wherein the check operator is inserted into the generated query plan.

6. The system of claim 5, wherein the check operator is inserted into the generated query plan by inserting a table scan operator that incorporates logic for the check operator.

7. The system of claim 1, wherein the check operator is inserted into the query plan in response to a value of k being less than a threshold value.

8. The system of claim 1, wherein the top k query operator comprises a limit operator configured with the threshold limit.

9. The system of claim 1, wherein after a first fragment of the database table has been processed, the operations comprise checking, by the check operator, whether the early exit has occurred before executing one or more low-level operators of the query plan to load a second fragment into the in-memory portion of the database execution engine.

10. A method comprising:

receiving a query request including a top k query operator for query plan generation, optimization, and execution, wherein k defines a threshold limit of query results for the top k query operator;

inserting into a query plan a check operator associated with the top k query operator;

in response to executing the query plan, checking, by the check operator, whether an early exit occurs due to the top k query operator reaching the threshold limit;

orchestrating, by the check operator, an order in which low level operators of the query plan are executed to load fragments of a database table into an in-memory portion of a database execution engine;

in response to the early exit occurring due to the top k query operator reaching the threshold limit, stopping processing, by the check operator, including opening of another fragment of a database table;

in response to the early exit not occurring, allowing, by the check operator, the opening of the other fragment of the database table; and returning, as a query result, a result set of the top k results.

11. The method of claim 10, further comprising:
executing, by a database execution engine, the query plan comprising the check operator and the top k query operator using a first fragment, wherein the check operator processes the first fragment and performs the checking whether the early exit occurs due to the top k query operator reaching the threshold limit.

12. The method of claim 11, wherein the check operator processes the first fragment and performs the checking whether the early exit occurs due to the top k query operator reaching the threshold limit before loading a second fragment.

13. The method of claim 10, wherein the check operator orchestrates fragment loading by giving preference to loading a first fragment into an in-memory portion of a database execution engine before use of a second fragment that requires loading into the in-memory portion of a database execution engine.

14. The method of claim 10, further comprising:
generating the query plan that includes the top k query operator, wherein the check operator is inserted into the generated query plan.

15. The system of claim 14, wherein the check operator is inserted into the generated query plan by inserting a table scan operator that incorporates logic for the check operator.

16. The method of claim 10, wherein the check operator is inserted into the query plan in response to a value of k being less than a threshold value.

17. The method of claim 10, wherein the top k query operator comprises a limit operator configured with the threshold limit.

18. The method of claim 10, wherein after a first fragment of the database table has been processed, the operations comprise checking, by the check operator, whether the early exit has occurred before executing one or more low-level operators of the query plan to load a second fragment into the in-memory portion of the database execution engine.

19. A non-transitory computer-readable storage medium including instructions which, when executed by at least one data processor, cause operations comprising:

receiving a query request including a top k query operator for query plan generation, optimization, and execution, wherein k defines a threshold limit of query results for the top k query operator;

inserting into a query plan a check operator associated with the top k query operator;

in response to executing the query plan, checking, by the check operator, whether an early exit occurs due to the top k query operator reaching the threshold limit;

orchestrating, by the check operator, an order in which low level operators of the query plan are executed to load fragments of a database table into an in-memory portion of a database execution engine;

in response to the early exit occurring due to the top k query operator reaching the threshold limit, stopping processing, by the check operator, including opening of another fragment of a database table;

in response to the early exit not occurring, allowing, by the check operator, the opening of the other fragment of the database table; and returning, as a query result, a result set of the top k results.

20. The non-transitory computer-readable storage medium of claim 19, further comprising:

executing, by a database execution engine, the query plan comprising the check operator and the top k query operator using a first fragment, wherein the check operator processes the first fragment and performs the checking whether the early exit occurs due to the top k query operator reaching the threshold limit.

* * * * *